United States Patent [19]

Beckerbauer

[11] 3,714,245

[45] Jan. 30, 1973

[54] UNSATURATED α-HYDROPERFLUOROALKYLSULFONYL FLUORIDES

[75] Inventor: Richard Beckerbauer, New Castle, Del.

[73] Assignee: E. I. du Pont de Nemours and Company, Wilmington, Del.

[22] Filed: Sept. 25, 1970

[21] Appl. No.: 75,693

[52] U.S. Cl. ............260/543 F, 260/87.5, 260/327 S, 260/544 F
[51] Int. Cl. ............................................C07c 143/70
[58] Field of Search ...................................260/543 F

[56] References Cited

UNITED STATES PATENTS

| 3,041,317 | 6/1962 | Gibbs et al. | 260/543 F |
| 3,282,875 | 11/1966 | Connolly | 260/543 F |
| 3,492,348 | 1/1970 | Boudakian et al. | 260/543 F |

*Primary Examiner*—Lorraine A. Weinberger
*Assistant Examiner*—Richard D. Kelly
*Attorney*—Edwin Tocker

[57] ABSTRACT

New compounds $CF_2=CF(CFR)_nCFHSO_2F$ wherein R is F or perfluoroalkyl containing one to five carbon atoms and $n$ is an integer of 1 to 5, are prepared by reacting $SO_3$ with the corresponding fluorocarbon diolefin to form a sultone, reacting the sultone with water, followed by decarboxylation. The compounds of this invention are useful as comonomers with tetrafluoroethylene, in the preparation of stable polymers with ion exchange capabilities.

2 Claims, No Drawings

UNSATURATED α-HYDROPERFLUOROALKYLSULFONYL FLUORIDES

This invention relates to new fluorocarbon vinyl sulfonyl fluorides.

Fluorocarbon vinyl sulfonyl fluorides have been disclosed in U.S. Pat. Nos. 3,282,875 to Connolly and Gresham and 3,041,317 to Gibbs and Griffin; and in Dutch Pat. Publication 12232/67.

The present invention provides a new series of fluorocarbon vinyl sulfonyl fluorides represented by the formula $$CF_2=CF(CFR)_nCFHSO_2F$$

wherein R is F or perfluoroalkyl containing from one to five carbon atoms and $n$ is an integer of 1 to 5. These compounds may also be referred to as unsaturated α-hydroperfluoroalkyl sulfonyl fluorides.

The compounds of this invention include:
$CF_2=CF-CF_2CFH-SO_2F$
$CF_2=CFCF_2CF_2CFHSO_2F$
$CF_2=CFCF_2CF_2CF_2CF_2CFHSO_2F$
$CF_2=CFCF(CF_3)CF_2CFHSO_2F$
$CF_2=CFCF(C_4F_9)CF_2CFHSO_2F$
$CF_2=CFCF_2CF(CF_3)CF(CF_3)CF_2CFHSO_2F$ The general procedure for preparing compounds of this invention is to react $SO_3$ with the diolefin compound $CF_2=CF(CFR)_nCF=CF_2$ wherein R and $n$ have the same meaning as hereinbefore described to convert one of the olefin groups to the sultone

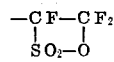

followed by reaction of the sultone with water to convert the sultone group to

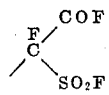

followed by decarboxylation in water to give the compound $CF_2=CF(CFR)_n-CFHSO_2F$.

The reaction of the diolefin with $SO_3$ is carried out at molar ratios of diolefin/$SO_3$ of 2 or greater to minimize reactions at both double bonds.

Alternately, one of the double bonds of the diolefin compound can be blocked (e.g., by halogenation) prior to reaction with $SO_3$ and subsequent reactions and the desired product formed by regeneration of the double bond. This is the preferred method for preparing the compound $CF_2=CFCF_2CFHSO_2F$ of this invention.

The compounds of the present invention are colorless liquids boiling above 80° C. and with density greater than 1.5 g./ml.

The compounds of this invention are useful as comonomers with tetrafluoroethylene to prepare stable fluorocarbon polymers containing $-SO_2F$ groups. These $-SO_3F$ groups can be converted into strong acid groups by hydrolysis resulting in copolymers with ion exchange properties. Copolymerization with tetrafluoroethylene can be carried out in the manner described in U.S. Pat. No. 2,946,763 to Bro and Sandt, especially Example 4 thereof. Conversion of the — $SO_2F$ groups in the resultant copolymer to other functional groups including the $-SO_2H$ group can be done by the procedures disclosed in U.S. Pat. No. 3,282,875 to Connolly and Graham.

The following examples are intended to be illustrative of the present invention and not as a limitation thereof (parts and percents are by weight unless otherwise indicated):

EXAMPLE 1

Into a dry flask was distilled 92 g. of 4,5-dichloro-octofluoropentene-1 (b.p. = 92° C.) and 40 g. of sulfur trioxide. The mixture was refluxed for 20 hours; the temperature rose from 40° to 54° C. Excess $SO_3$ was distilled out, followed by 109 g. of the sultone (b.p. = 55°/25 mm; vapor phase chromatography retention time relative to air = 13.8 on a 20 foot × ¼ inch dia. 20 percent Fluorolube S30 (liquid polymer of chlorotrifluoroethylene) on Chromosorb column at 100° C., He flow 100 ml./min.). $F^{19}$ N.M.R. spectrum supports the structure with chemical shifts (in ppm. from $CFCl_3$) as listed

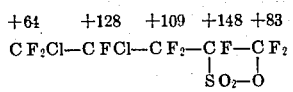

The I.R. spectrum has a strong peak at 1,440 $cm^{-1}$ (sultone) and no absorption from 1,440 to 4,000 $cm^{-1}$. This sultone product (91 g.) was stirred with 100 ml. of water until $CO_2$ evolution stopped (4 hours). The lower layer was separated dried and distilled to give 73.2 g. of the α-hydrosylfonyl fluoride, (b.p. = 158° vapor phase chromatography relative retention time 15.1). Chemical shifts of $F^{19}$ N.M.R. spectrum are:

+64  +132  +114  +184  −55

$CF_2Cl - CFCl - CF_2 - CFH - SO_2F$

Proton N.M.R. shows one —CFH— group. The I.R. spectrum has a strong band at 1,460 $cm^{-1}$ ($-SO_2F$) and a weak absorption at 3,000 $cm^{-1}$ (C-H).

This product (10 g.) was refluxed with 4 g. of zinc dust in 50 ml. of dioxane for 2 hours, filtered and added to a dilute aqueous HCl solution. The lower layer was separated and washed 3 times to yield the unsaturated α-hydrosulfonyl fluoride (b.p. = 90° est., vapor phase chromatography relative retention time = 3.24). Chemical shifts from $F^{19}$ N.M.R. are

+112 +119 +105  +189  −55

$CF_2 = CF - CF_2 - CFH - SO_2F$

Proton N.M.R. shows one —CFH— group. (All N.M.R. spectra contain the appropriate coupling constants for the assigned structures). The I.R. spectrum has strong absorption at 1,458 $cm^{-1}$ ($SO_2F$) and 1,785 $cm^{-1}$ ($CF_2 = CF-$) and weaker absorption at 3,000 $cm^{-1}$ (C-H). Mass spectroscopy analysis also supports the structure.

This procedure can be followed to prepare the remaining compounds of this invention, starting with the corresponding diolefin starting material and chlorinating one of its double bonds.

EXAMPLE 2

Into a dry flask containing 12.5 g. (0.005 mole) of perfluorobiallyl was distilled 0.05 mole of $SO_3$. The mixture was refluxed for 24 hours; the temperature rose from 42°–61° C. The unreacted starting materials were distilled out leaving a clear liquid (b.p. ~ 115 est., vapor phase chromatography relative retention time = 4.43). This product, purified by trapping from the V.P.C. column, has an I.R. spectrum with strong absorption at 1,440 $cm^{-1}$ ($CF_2=CF-$) and no absorption near 3,000 $cm^{-1}$ (C–H). This product was stirred in water at 60° for 1 hour, evolution of $CO_2$ ceased and the lower layer was removed and dried. Vapor phase chromatography showed complete conversion to the compound $CF_2=CF(CF_2)_2CFHSO_2F$ (b.p. = 120° C. est.). The I.R. spectrum had strong bands at 1,455 $cm^{-1}$ ($SO_2F$) and 1,783 $cm^{-1}$ ($CF_2=CF-$) and a weaker bank at 3,000 $cm^{-1}$ (—C–H). By starting with the corresponding diolefin, this procedure can be used to prepare the remaining compounds of this invention wherein $n$ is 3, 4 and 5.

The starting diolefins can be prepared by the processes disclosed in the following articles: "Cesium Fluoride Catalyzed Rearrangement of Perfluorodienes to Perfluorodialkylacetylenes" J. Am. Chem. Soc. 83 1767 (1961); "Preferential Replacement Reactions of Highly Fluorinated Alkyl Halides. II Some Reactions of Fluorinated Allyl Iodides," J. Am. Chem. Soc. 79 4170 (1957); J. E. Fearn and L. A. Wall, "Preparation and Polymerization of Some Perfluorodienes," National Bureau of Standards Report (April, 1964); and J. E. Fearn and L. A. Wall, "Polymers of Perfluorohexadiene, Perfluoroheptadiene, and Perfluorooctadiene," National Bureau of Standards Report 8623 (February, 1965).

As many widely different embodiments of this invention may be made without departing from the spirit and scope thereof, it is to be understood that this invention is not limited to these specific embodiments thereof except as defined in the appended claims.

What is claimed is:

1. Compounds of the formula $$CF_2=CF(CFR)_nCFHSO_2F$$

wherein R is F or perfluoroalkyl containing from one to five carbon atoms and $n$ is an integer of 1 to 5.

2. The compound $CF_2=CFCF_2CFHSO_2F$.

* * * * *